(No Model.)

J. W. KENNEDY.
FENDER FOR CULTIVATORS.

No. 381,701. Patented Apr. 24, 1888.

WITNESSES:

INVENTOR:
J. W. Kennedy.
BY Munn & Co.
ATTORNEYS.

UNITED STATES PATENT OFFICE.

JOHN W. KENNEDY, OF MILTONVALE, KANSAS.

FENDER FOR CULTIVATORS.

SPECIFICATION forming part of Letters Patent No. 381,701, dated April 24, 1888.

Application filed January 17, 1888. Serial No. 260,986. (No model.)

*To all whom it may concern:*

Be it known that I, JOHN W. KENNEDY, of Miltonvale, in the county of Cloud and State of Kansas, have invented a new and useful Improvement in Fenders for Cultivators, of which the following is a full, clear, and exact description.

This invention relates to fenders used on corn and other cultivators, including cotton and sugar-cane cultivators, but designed more particularly for cultivators used on growing check-rowed corn and especially listed corn.

The invention consists in a fender of single or separate and novel construction, substantially as hereinafter described, and pointed out in the claim, and applicable to both single and double plow cultivators.

Reference is to be had to the accompanying drawings, forming a part of this specification, in which similar letters of reference indicate corresponding parts in all the figures.

Figure 1:
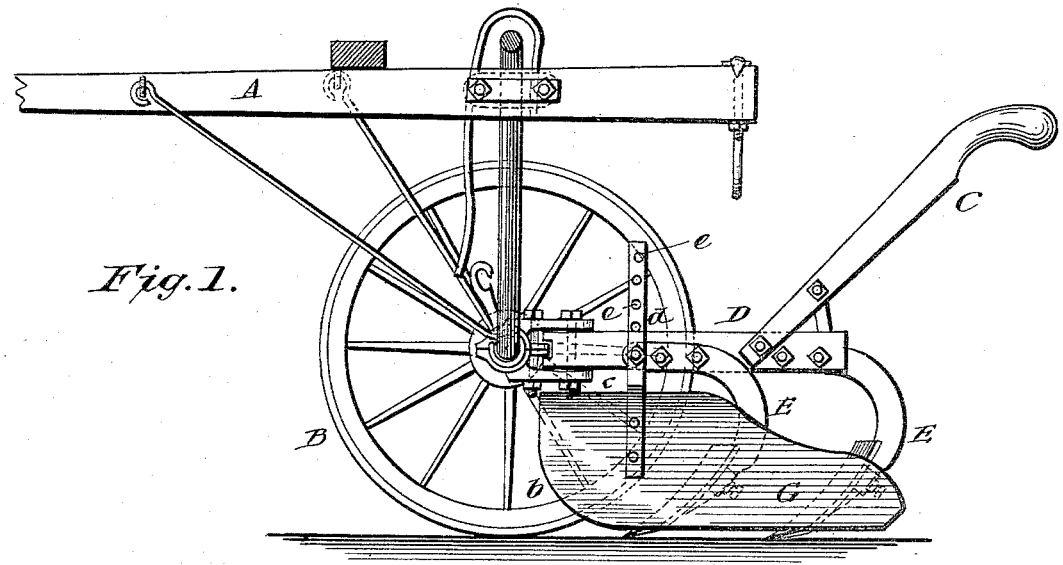
Figure 2:
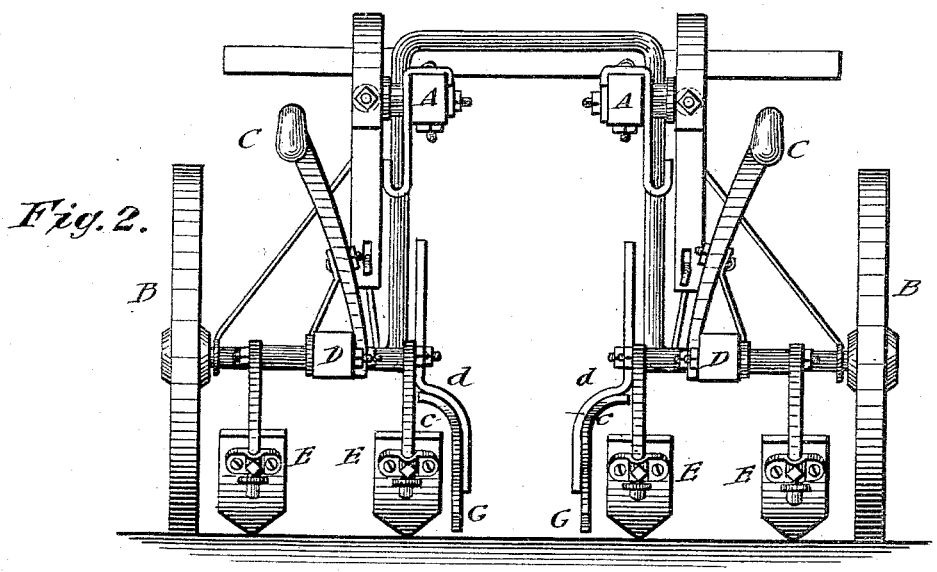
Figure 3:
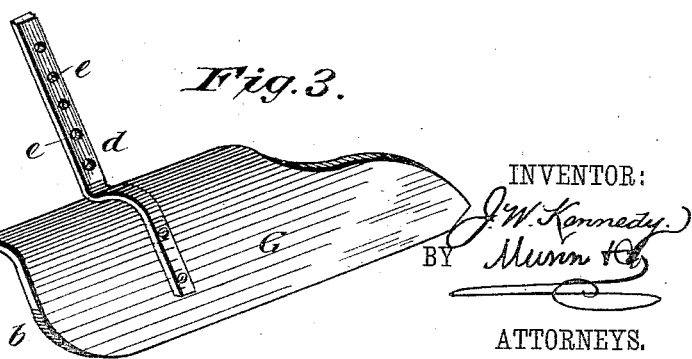

Figure 1 represents a sectional side view of an ordinary straddle-row cultivator with two of my improved fenders applied, and Fig. 2 a rear elevation of the same. Fig. 3 is a view in perspective of the fender with attached adjusting-bar detached from the cultivator.

A A are the draft bars or shafts of the cultivator; B B, its running wheels; C C, its handles; and D D the beams to which the cultivator teeth or shovels E E are attached.

G G are the fenders, arranged upon the inner side of the inner one of each pair of shovels E E—that is, upon opposite sides of the row to be cultivated. Each of these fenders G is in the form of an elongated flat blade or plate rounded below in front, as at $b$, and having its upper marginal portion curled over on its outer side, as at $c$, toward and above the adjacent shovel E, with which it works in connection. These fenders in no way interfere with the handling of the plow or cultivator, and the curled portions $c$ at their tops make them act as a mold-board of a stirring-plow to turn away the trash from the corn or plant being cultivated. They are not only simple, but easily attached to either single or double plow cultivators of different make without changing the cultivator or using extra bolts, and are made capable of adjustment up or down to adapt them to the corn or plant and to different kinds of land by providing each fender with a curved bar or strap, $d$, running upward and having any number of perforations, $e$, arranged one above the other, and through which the same bolt that secures the adjacent shovel to the frame may be passed, or a separate bolt be used, if desired.

Having thus described my invention, what I claim as new, and desire to secure by Letters Patent, is—

A fender for cultivators, consisting of the flat blade G, rounded at its lower front corner, as shown at $b$, curved outward along its upper longitudinal edge, as shown at $c$, and the apertured strap $d$, curved between its ends to fit the curve $c$, and secured to the blade, substantially as set forth.

JOHN W. KENNEDY.

Witnesses:
GEO. F. LEMING,
CHARLES STOCK.